April 21, 1970  MAKOTO YAMASHITA ET AL  3,507,562
REAR VIEW MIRRORS

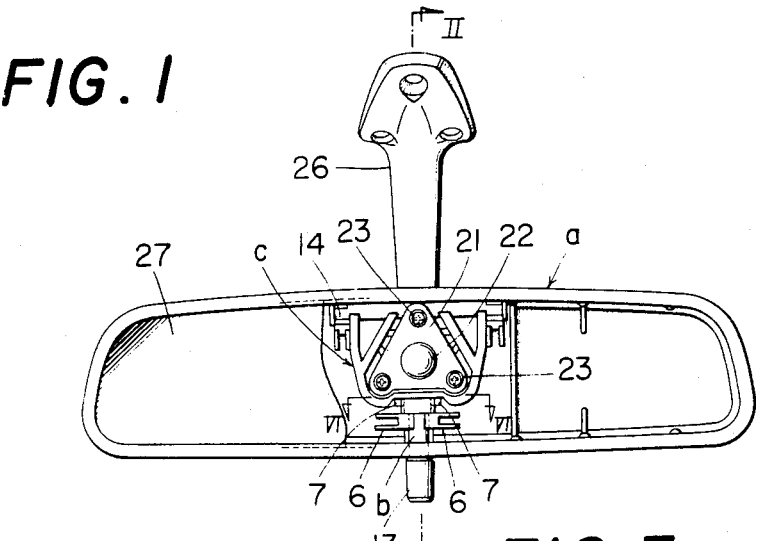
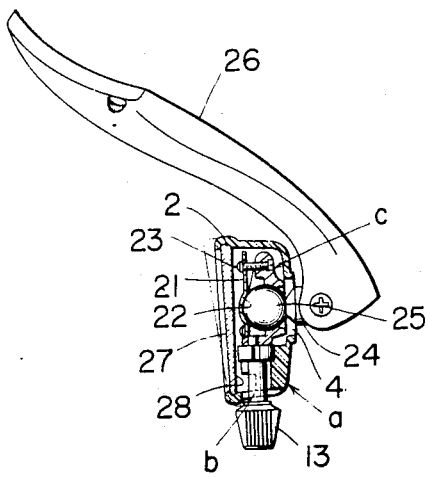
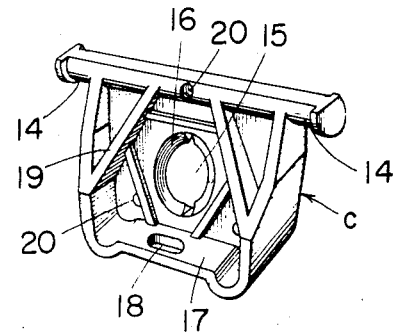
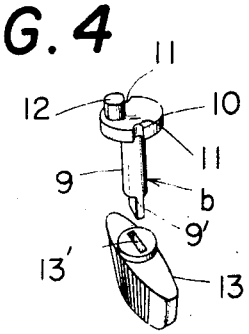
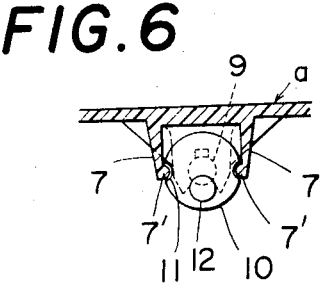

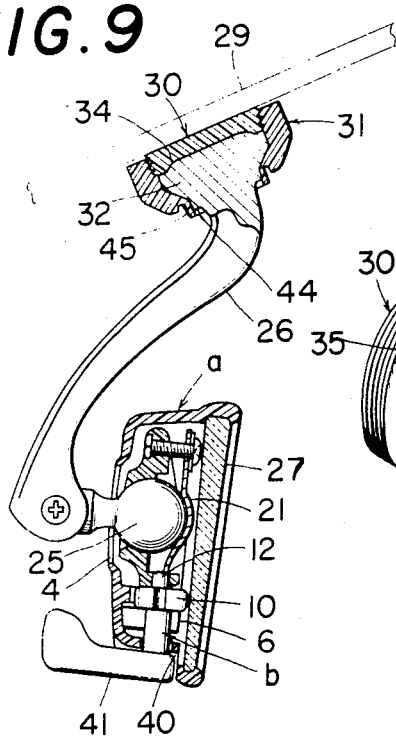
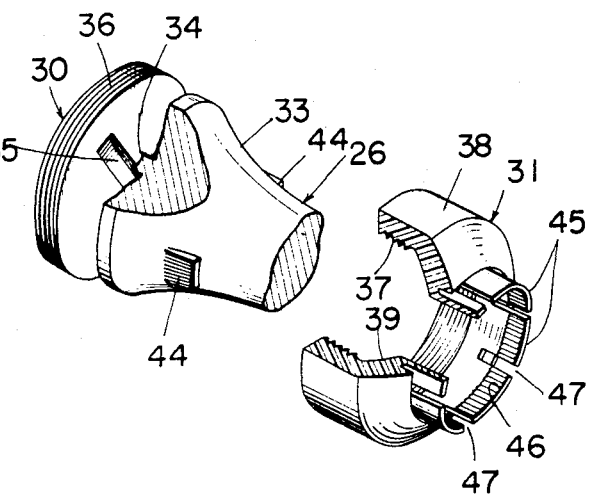
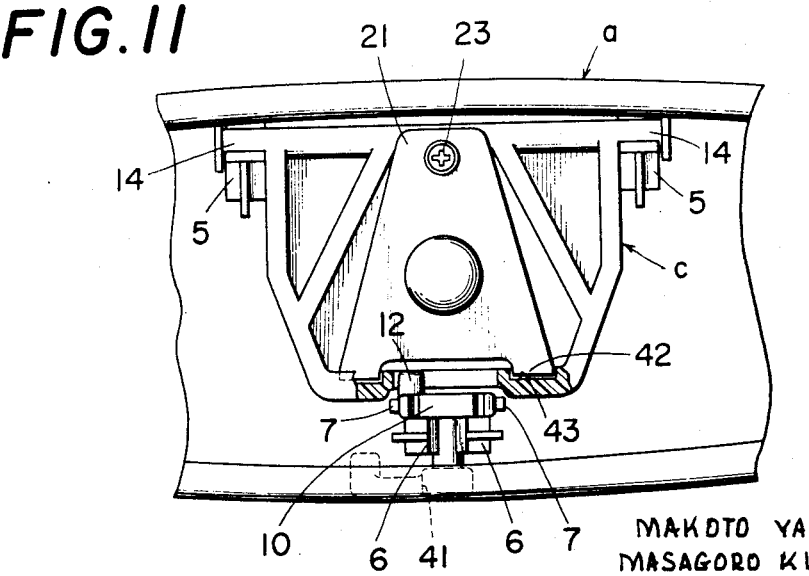

Filed Feb. 26, 1968  4 Sheets-Sheet 4

MAKOTO YAMASHITA AND
MASAGORO KUSHIDA,
INVENTORS

United States Patent Office 3,507,562
Patented Apr. 21, 1970

3,507,562
REAR VIEW MIRRORS
Makoto Yamashita, Kanagawa-ken, and Masagoro
 Kushida, Tokyo, Japan, assignors to Kabushiki
 Kaisha Ichikawa Seisakusho, Tokyo, Japan
Filed Feb. 26, 1968, Ser. No. 708,315
Claims priority, application Japan, Feb. 28, 1967,
42/16,699; Mar. 10, 1967, 42/19,695
Int. Cl. G02b 9/12
U.S. Cl. 350—281                               10 Claims

ABSTRACT OF THE DISCLOSURE

A rear view mirror for automobiles comprising a mirror box assembly preferably of plastic materials, including an open front mirror box, a mirror therein having high and low reflection factor reflective surfaces crossing mutually at a certain angle, a fixture also of plastic material including therewith a reflection factor change-over stem; and said mirror as disposed within the open front side of the mirror box has the reflection factor alterable only upwardly or downwardly by rotating the change-over stem.

---

The invention relates to the rear view mirrors of which the reflection factor of the rear view mirror facing the driver can change over to either high or low.

The foregoing reflection factor change-over type rear view mirror is well-known as shown in the U.S. Patent No. 3,029,701. This well-known rear view mirror can change-over the reflection factor which is its essential object, but as the number of parts is numerous and the construction complicated, there lies a fault in that efficient mass producing is not suitable.

The main object of this invention is to provide a reflection factor change-over type rear view mirror which may be efficiently and easily produced by utilising the technics of the one unit molding, limiting the number of parts to the minimum and inserting the various parts.

Another object of this invention is to provide a reflection factor change-over type rear view mirror which is shock proof, so that the images are clear with greatly reduced or no vibration being imparted thereto when the vehicle is running.

Another object of this invention is to provide a rear view mirror with a high safety rate and to prevent hazards when a vehicle stops abruptly or by other causes making the passenger fall forward and bump against the mirror, causing a buffer action. When the shock reaches over a certain limit, the rear view mirror drops.

Another object of this invention is to provide a rear view mirror for vehicles which the switching of the reflection factor can be performed easily.

These together with other objects and advantages which will become subsequently apparent reside in the details of construction and operation as more fully hereinafter described and claimed, reference being had to the accompanying drawings forming a part thereof, wherein like numerals refer to like parts throughout, and in which:

FIG. 1 showing the first embodiments of this invention, indicates the front side view of the inside of a cut section of the mirror;

FIG. 2 is a vertical sectional view taken on lines II—II of FIG. 1;

FIG. 3 is a perspective view of the fixture which is employed for connecting the mirror box and stay of the same embodiments;

FIG. 4 is a perspective view of a disassembled change-over knob of the mirror at a slant angle of the same embodiment;

FIG. 6 is a cross sectional view taken on lines XI—VI of FIG. 1;

FIG. 9 is a vertical sectional side view of the rear view mirror showing other embodiments;

FIG. 10 is a disassembled perspective view partly in section, showing the fixing construction of the stay of the same FIG. 9 embodiment;

FIG. 11 is an enlarged front view of a portion of the FIGS. 9 and 10 embodiment with the inside of the mirror removed;

Figure 5:
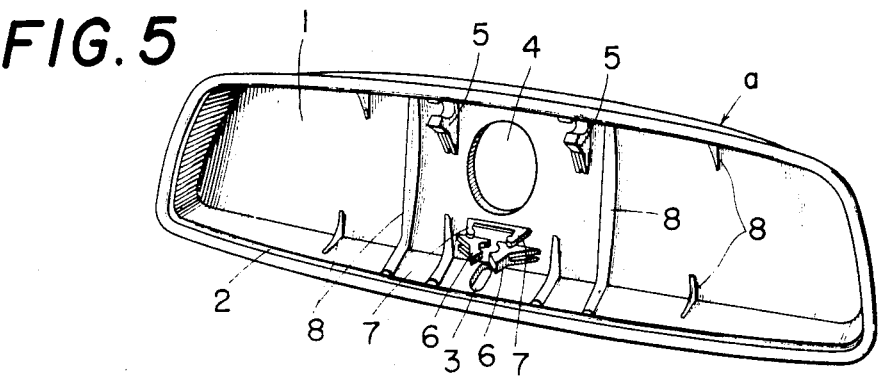
FIG. 5 is a perspective view of the mirror box of the same embodiment.

In FIGS. 1 to 6, mark $a$ is a mirror box of mold processed synthetic resin with an opening part 1 at the front side, 2 is the concave groove for inserting the mirror and is formed and bordered around the inside of the said opening part, 3 is an opening for inserting the change-over stem which is opened on the lower side of the mirror box, 4 is an opening for inserting the articulated ball supporting stem which opens on the back side plate of the mirror box, and 5, 5 represents a pair of bearings formed integrally with the body of the mirror box and are positioned on both sides and slightly above the foregoing opening 4. The change-over stem holder unit includes the left and right portions 6, 6 making a pair protruding from the inside of the mirror box toward the front and located between the middle of the foregoing openings 3 and 4. Stop means for said stem include spaced left and right arm pieces 7, 7 protruding slightly above the said change-over stem holder unit, the free end of each arm including a projection or detent 7′ facing each other. Various rib brackets and gussets 8, 8 are mounted inside of the mirror box. The foregoing various parts are preferably integrally formed as one body of plastic such as synthetic resin to constitute the mirror box.

Part $b$ is the change-over stem and its stem section 9 is held by the holder unit 6, with the lower part of the stem passing through the opening 3 of the mirror box, projecting to the outer side. 10 is a disc formed on the upper end of the change-over stem $b$ and the concave grooves 11 and 11 are formed on the border of the disc in a diametrically opposite position. 12 is an eccentric stem protruding from the upper surface of the said disc 10 at an eccentric position. 13 is the knob to be fitted on the lower end of the change-over stem $b$, and the flat section 9′ of the lower end of the stem 9 is inserted into the long opening 13′. When the knob 13 rotates, the stem 9 rotates.

Part $c$ is a one piece fixture of molded synthetic resin and formed with trunnion stems 14, 13 on its upper left and right sides. An opening 15 for the articulated ball holding and the swivel washer 16 are provided on the center of the fixture $c$, and there is also provided an oval slot 18 on the bottom portion 17 to receive the foregoing eccentric stem 12. Said fixture includes oppositely disposed molded reinforcing ribs 19 and a screw mounting hole 20.

Numeral 21 is a plate spring, which cooperates with the fixture $c$, to hold the articulated ball. It has a recess 22 positioned almost in the middle complemental with and to receive the articulated ball, and is fixed to the fixture by a screw 23 disposed in holes 20.

Numeral 24 is the articulated ball holding stem having the articulated ball 25 on its end, and 26 shows a stay which holds the foregoing articulated holding stem on its end.

A mirror 27 is made of high transparency glass or synthetic resin and as shown in FIG. 2, it is of triangular section and has a vacuum evaporation layer of aluminum and other high reflection surface 28 on the back surface side and the front is glass or synthetic resin forming a low reflection surface as it is.

The rear view mirror relating to this invention is assembled as follows: That is, firstly, with the eccentric stem 12 of the upper end of the change-over stem b inserted into the hole 18 being provided on the bottom 17 of the fixture c, lay the fixture c on top of the inside of the mirror box a and from the top extending over the opening 4 insert the articulated ball holding stem 24 having the ball 25 and lay the spring plate 21 on top of it. Insert the screws 23, which hold the articulated ball 25 between the swivel washer 16 of the fixture and the recess 22 of the plate spring 21. Next, the trunnion stem parts 14 and 14 of the fixture c are inserted in the bearings 5 and 5 of the mirror box a and stem part 9 of the change-over stem b is pushed into the holder units 6 and 6 of the mirror box a. The detents 7', 7' formed at the end of the stop means arms 7 of the mirror box insert into the concave notches 11 and 11 of the border of the disc 10. The knob 13 is applied to the lower end 9' of the said change-over stem 9, and lastly, the mirror 27 fix into concave groove of the mirror box which completes the construction. As the foregoing mirror box and the various parts are molded together as a unitary body and are of synthetic resin materials having an elasticity, and/or certain yieldability which greatly facilitates the assembly operation and results in a stable, secure overall construction.

When the rear view mirror is constructed in this way and the knob 13 is rotated 180°, the eccentric stem 12 draws near the mirror 27 (as shown in solid line of FIG. 2) or draws it away (FIG. 6), thereby changing the slant or its angle of inclination, accordingly, so that the low reflective surface (surface of the mirror) or the high reflective surface 28 are selectively pointed out to the driver. Because the stop arms 7 are formed by synthetic resin materials having inherent yieldable characteristics, no other springs are required, and the arms 7, 7 open and return to normal due to the elasticity thereof and the detents 7' cooperate with the side grooves 11 and 11 of the disc 10, thus retaining the selected angle of inclination of the mirror box.

The entire mirror box in the rear view mirror of the present invention, as stated in the foregoing, is made of synthetic resin materials, therefore, the absorption of vibration of the unit itself is good, having a high resistance against shock, thus the mirror is immovable and does not oscillate immoderately. Although it is a reflection factor switch type, the mirror 27 is fitted and fixed into the mirror box, the entire mirror box inclines, pivoting around the trunnion stem parts 14 and 14 of the fixture c, and the mirror box is held securely by two upper and lower points that is, the said stem parts 14 and holder units 6. Therefore, its durability and shock-proof are excellent and it can be operated smoothy.

Furthermore, because the bearing part 5, the holder units 6, and stop arms 7, etc. are molded in one body with the mirror box, therefore, no metal materials and fewer overall parts are used, thus, simplifying the assembling work as the various parts are either fitted in or snapped in greatly increasing the efficiency rate.

Figure 7:
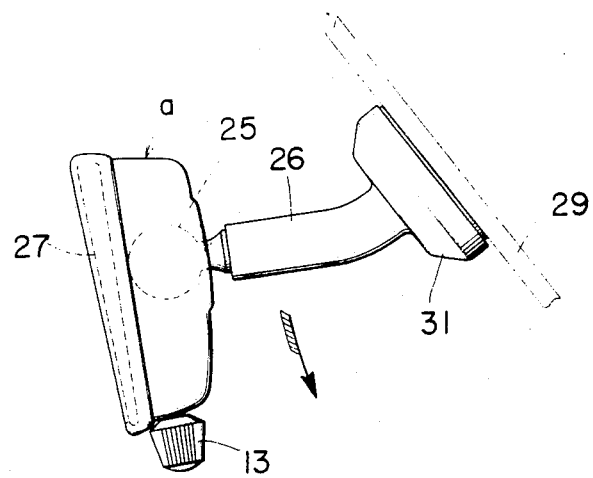
FIG. 7 is a side view of a basic example, showing a fitting construction of the mirror and the stay, taking into account the safety against shock.
Figure 8:
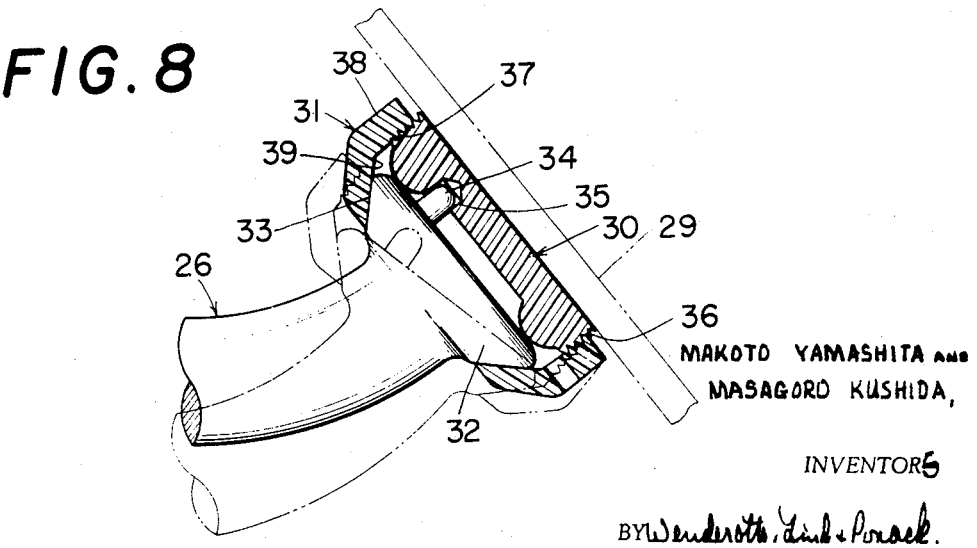
FIG. 8 is an enlarged vertical sectional side view of a part of the fitting base of the stay.
Figure 12:
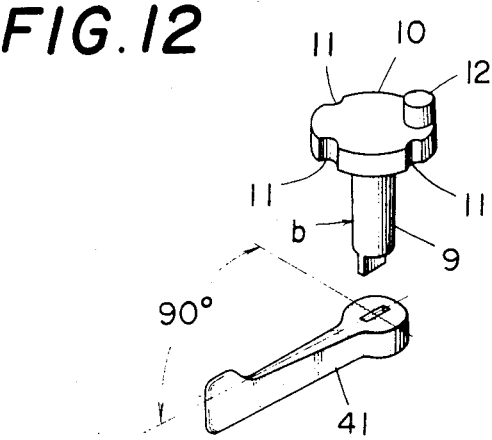
FIG. 12 is a perspective view of this latter embodiment showing the disassembled change-over stem and knob for changing the slant angle of the mirror.

The construction of the foregoing embodiment, fixes the suport stay 26 inside the driver's compartment, but as shown in FIGS. 7 and 8 the construction is such that the mirror is readily displaceable when subjected to a predetermined shock thereby providing a much safer and potentially less dangerous installation.

Namely, the embodiment in FIGS. 7 and 8 show the placing of the stay 26 holding the mirror box a to a base material 30 adhered to a front glass 29, which are mounted with a cap 31, molded from acetal resin and ABS resin a variety of synthetic resin having a bending and elasticity rate of 200,000 to 1,000,000 p.s.i. The foregoing such synthetics normally have a Rockwell hardness R scale of about 50 to 130. Furthermore, the foregoing synthetic resin include synthetic resin other than acetal resin or ABS resin, which have been made with the same bending and elasticity by mixing the appropriate materials.

A taper surface 33 is provided on a base 32 of the stay 26 and also a small boss 34 for the position determiner on the bottom surface. The base material 30 is adhered to the front side glass 29 is, for instance, a flat disc like shaped light alloy product and a concave part 35 which fits in the foregoing small boss, and also a male screw 36 is provided on its outer border. The material of the cap 31 is the same as the foregoing and is provided with a surrounding wall with the male screw 37 formed inside and the taper wall 39 which gradually decreases the diameter of the surrounding wall. The inside of the taper wall 39 has a degree which corresponds to the taper surface 33 of the base section of the foregoing stay.

In this way, the base material 30 is adhered to the front glass. Place on this base material, base section 32 attached to the taper of the stay and as the cap 31 is screwed into the base material 30, the stay can be fixed to the decided position by clamping the taper surface 33 of the base section of the stay 26 by the inside of a taper wall 39 of the cap 31. However, when shock is added from the front side of the miror box, a force as shown with an arrow mark in FIG. 7, acts on the stay 26 and this force is transmitted to the cap 31 through the medium of the base section 32. Therefore, a surrounding wall 38 of the cap 31, causes elastic deformation performing buffer action and when it reaches over the limit degree, the binding of the surrounding wall 38 and base part material 30 resolves and the cap 31 together with the cap 31 drops from the base material 30, as shown in the chain line of FIG. 8.

In case of an accident where the driver's head or other parts of the body pumps against the mirror, the stay 26 drops together with the cap 31 from the base material 30 fixed on the front side glass 29 when the force of impact degree exceeds the impact. Therefore, shock can be eased when the head or the body bumps against the mirror and the danger of receiving injuries can be lessened, checking injuries to the minimum, as after the mirror section drops, only the flat base material 30 remains.

On the embodiment of FIGS. 1 to 6 the knob 13 of the change-over stem protrudes, so there is a danger of being injured by the knob 13 when the driver bumps against it. The embodiments shown in FIGS. 9 to 12 eliminates such danger and simultaneously, the rate of safety is raised as the fitting construction of the stay is the same as the FIG. 8.

That is, on this embodiment, the angle of inclination is made so that it can be changed by making the recess 40 in the center of the bottom part of the mirror box a, leading out the lower end of the change-over stem from the recess 40 and mounting to it the lever 41 which bends backwardly at a right angle from the said stem, providing the respective notches or concave groove 11 positioned on the quadrisection of outer periphery of the disc 10 of the upper part of the change-over stem, and by rotating the lever 41 to 90°. In this case, the lever 41 is housed in the foregoing recess 40 better seen in FIGS. 9, 11 and 13 and as it does not protrude from the outer circuit rim of the front side, there is no danger.

The difference of the mirror section of these embodiments when comparing with the embodiments of the FIGS. 1 to 6 is, the foregoing lever is made so that it does not protrude, and a slight difference in the mounting construction of the plate spring 21 and fixture c, however, the main construction of the others are identical. Namely, in the embodiments of the FIGS. 1 to 6, the plate spring 21 are fixed by three screws against this embodiment, where the ligulate piece 42 protrudes from the both sides of the lower end of the plate spring 21 and is inserted into the insertion groove 43 being formed on the bottom of the fixture c, and is fixed to only one upper section by screw 23, thus, further simplifying the assembly therefor.

The fitting construction of these embodiments is basically identical to the foregoing FIGS. 7 and 8, however, cap locking is annexed to it. That is, the projection 44 with an uneven outer surface, such as straight knurling is formed a little above the taper surface 33 of the base section of the stay 26, and cap 31 is provided with a thin cylinder section 45 connected to the upper part of the taper wall 39. The inside of the said cylinder section is provided with the complementary knurling 46 along with the slots 47 made at regular intervals according to necessity. When the cap 31 is rotated and screwed into the base part material 31, it clamps as the projection 44 and the knurling of the cylinder section 45 threads, thus, the cap does not loosen by the threading of the said projection and the cylinder section.

In the foregoing various embodiments, are shown the articulated ball of the swivel joint housed in the mirror box, but the articulated ball can be set on the outer side of the mirror box.

Figure 13:
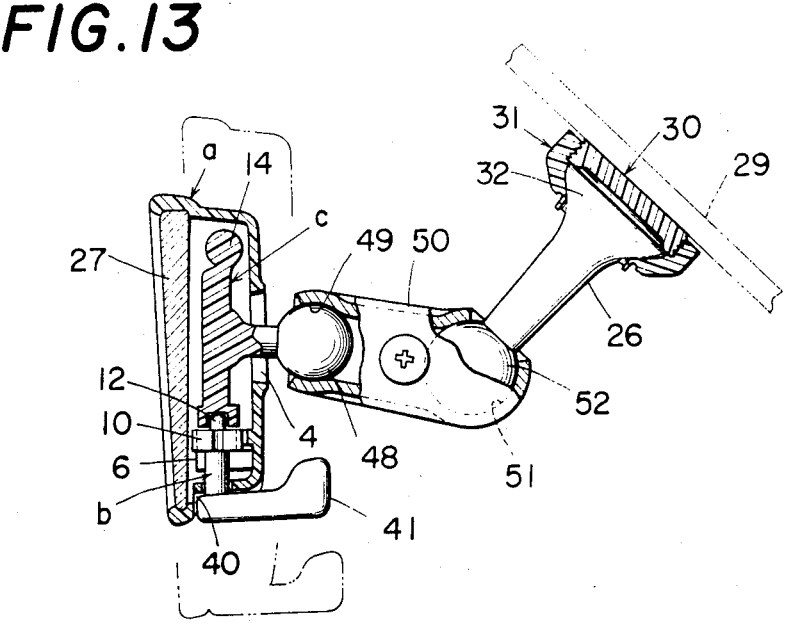
FIG. 13 is a side view of a section of a part of the rear view mirror showing still another embodiment of this invention.

FIG. 13 shows one of the latter examples with the articulated ball 48 protruding and set in one unit from the back of the fixture c, and the articulated ball is inserted in a supporting unit 50 with the swivel washer or socket 49. In this way, the mirror box can be made much thinner. Also, in these embodiments, for the foregoing supporting unit, a two piece combined medium supporting unit having both the swivel washer 49 and 51 at opposite ends is preferably used. Articulated ball 52 of the lower end of the stay 26 is inserted into the swivel washer 51 behind the said supporting unit, thereby providing a dual swivel articulation. By this means, it is possible to adjust the mirror box to the upper and lower side on a large scale as shown the chain line in the drawing, and when the reflection factor change-over by the knob 13 rotation is used jointly, every adjustment is possible and convenient.

What is claimed is:
1. An adjustable rear view mirror assembly for automobiles comprising in combination:
   (a) a mirror mounting stay having a mounting ball on one end and means on the other end for detachably mounting said stay to a support member such as the automobile windshield or dashboard;
   (b) a one piece mirror box of molded synthetic resin plastic having an open front side defined by a continuous circumferential wall of top, bottom and side wall portions, and a generally centrally apertured back wall to receive the ball of said mounting stay through said apertured wall, said mirror box also having integrally molded trunnion stem bearings and mirror changing stem support and detent means;
   (c) a mirror having high and low reflection factor reflective surfaces mutually crossing at a predetermined angle, said mirror disposed within the front side of said mirror box;
   (d) a one piece molded synthetic resin plastic supporting fixture disposed within said mirror box, said fixture including a generally planar wall to be generally disposed parallel to the back wall of said mirror box, said fixture back wall being apertured in corresponding alignment with the apertured back wall of said mirror box to also receive said ball, said fixture wall and aperture being provided with ball seating means for said ball, and said fixture including oppositely extended, generally horizontal trunnion stem arms extending in the general plane of said back wall and disposed within said bearings of the mirror box; and a transversely disposed, centrally apertured, lower wall portion extending forwardly from said planar wall, with the aperture of the latter aligned generally fore and aft with, but extending laterally of a generally corresponding aperture provided similarly in the mirror box circumferential bottom wall portion, to receive therein an end of an upstanding mirror position changing stem; and
   (e) mirror position changing stem means including a lower changing stem projecting from exteriorly of the mirror box to the interior through said aperture in said mirror box bottom wall; a disc member centrally attached to the upper end of said lower changing stem and said disc being peripherally notched at diametrically opposite portions, said lower stem being rotatably supported in said support means of the mirror box and said disc member being engaged in the notches by said detent means of said mirror box; said mirror stem means further including an upstanding stub shaft or stem adjacent an edge of the disc member and eccentrically offset with respect to said lower stem and inserted within the aperture of the lower wall of said supporting fixture whereby 180° rotation of the lower stem causes the mirror box to pivot about a generally horizontal axis of the trunnion stem arms with respect to said supporting fixture to assume a downward or upward selective mirror change position.

2. An adjustable rear view mirror assembly for automobiles comprising in combination:
   (a) a mirror mounting stay having a first mounting ball on one end and means on the other end for detachably mounting said stay to a support member such as the automobile windshield or dashboard;
   (b) a one piece mirror box of molded synthetic resin plastic having an open front side defined by a continuous circumferential wall of top, bottom and side wall portions, and a generally centrally apertured back wall to receive a mounting stem of a support fixture through said apertured wall, said mirror box also having integrally molded trunnion stem bearings and mirror changing stem support and detent means;
   (c) a mirror having high and low reflection factor reflective surfaces mutually crossing at a predetermined angle, said mirror disposed within the front side of said mirror box;
   (d) a one piece molded synthetic resin plastic supporting fixture disposed within said mirror box, said fixture including a generally planar wall to be generally disposed parallel to the back wall of said mirror box, said fixture back wall being provided with a mounting stem having a second ball on the end in corresponding alignment with the apertured back wall of said mirror box and projecting therethrough said fixture including oppositely extended, generally horizontal trunnion stem arms extending in the general plane of said back wall and disposed within said bearings of the mirror box; and a transversely disposed, centrally apertured, lower wall portion extending forwardly from said planar wall, with the aperture of the latter aligned generally fore and aft with, but extending laterally of a generally corresponding aperture provided similarly in the mirror box circumferential bottom wall portion, to receive therein an end of an upstanding mirror position changing stem;
   (e) mirror position changing stem means including a lower changing stem projecting from exteriorly of the mirror box to the interior through said aperture in said mirror box bottom wall; a disc member centrally attached to the upper end of said lower changing stem and said disc being peripherally notched at diametrically opposite portions, said lower stem being rotatably supported in said stem support means of the mirror box and said disc member being engaged in the notches by said detent means of said mirror box; said mirror stem means further including an upstanding stub shaft or stem adjacent an edge of the disc member eccentrically offset with respect to said lower stem and inserted within the aperture of the lower wall of said supporting fixture, whereby rotation of the latter causes the mirror box to pivot about a generally horizontal axis of the trunnion stem arms with respect to said supporting fixture and notched periphery to assume a downward or upward selective mirror change position; and (f) means interconnecting the first and second mounting balls to provide a double articulated mounting for the mirror assembly.

3. An adjustable rear view mirror assembly as defined in claim 1 wherein the circumferential wall of the mirror box is peripherally grooved to receive by snap action assembly of the mirror therewith.

4. An adjustable rear view mirror assembly as defined in claim 1 wherein the ball seating means of paragraph (d) further include a swivel washer seat in said planar wall, a generally planar spring plate having a concave ball receiving portion disposed generally centrally thereof and means for retaining said spring plate in assembly therewith including screw and molded plate retaining ligulate means on said fixture.

5. An adjustable rear view mirror assembly as defined in claim 1 wherein the detachable mounting means on mirror mounting stay of paragraph (a) include complementally formed male and female threaded fittings the threads of which are of a character to permit yieldable detachment from one another responsive to a predetermined shock load applied thereto.

6. An adjustable rear view mirror assembly as defined in claim 1 wherein the mirror changing stem projects from the lower portion of the mirror box and is provided with an operating knob at the lower end; and said mirror box is molded with a recessed portion to receive said operating knob in a non-forwardly protruding manner to provide for a flush or non-protruding safety factor mounting of said operating knob, with respect to the overall dimension of said mirror box.

7. An adjustable rear view mirror assembly as defined in claim 1 wherein the disc member of said mirror changing stem means of paragraph (e) is provided with four peripheral notches disposed 90° apart, and said mirror changing stem is rotated only 90° at a time to provide for greater selective changing of reflection factor of the mirror.

8. An adjustable rear view mirror assembly as defined in claim 1, wherein the means of paragraph (a) for detachably mounting the stay comprises:

(a) a cylindrical base having one flat surface for engageable attachment with the support surface, and having male peripheral threads, (b) a tapered flange on the end of said mounting stay for engagement with the cylindrical base surface opposite that attached to the support surface, said tapered flange being of a circumferential size not in excess of the male threads root diameter, (c) an annular collar or cap member having complemental female threads at one end for cooperation with the male threads and a complemental tapered holding portion at the opposite end, to engagingly overlay and retain the tapered flange of said stay, said male and female threads being of a relative size and character with at least one of them being of plastic material to enable non-rotative axial separation thereof responsive to application of a predetermined force thereagainst as a safety precaution to preclude injury by personal engagement against an otherwise relative immovable object; and (d) said cylindrical base and said tapered flange having complemental interengaging means to positively orient and to preclude relative rotative movement of the base and flange when held in fully assembled condition by said collar.

9. An adjustable rear view mirror assembly as defined in claim 8 wherein the cylindrical base, the mounting stay, and the cap are of molded synthetic resin plastic material having a bending and elasticity rate of from 200,000 to 1,000,000 p.s.i.

10. An adjustable rear view mirror assembly as defined in claim 8 wherein the tapered flange of the mounting stay is provided with at least partially knurled shoulder areas on separated parts of its outer surface, and the collar adjacent its tapered holding portion is provided with internal complemental knurling areas which complemental knurling areas are generally axially directed and interengage with each other to provide a lock to preclude inadvertant or vibrational loosening of said collar

References Cited
UNITED STATES PATENTS

| | | | |
|---|---|---|---|
| 2,146,859 | 2/1939 | Seklehner | 248—467 |
| 2,466,625 | 4/1949 | Ulmer | 350—278 |
| 2,810,604 | 10/1937 | Francis | 350—276 |
| 2,995,983 | 8/1961 | Davis | 248—467 |
| 3,029,701 | 4/1962 | Nelson | 350—281 |

PAUL R. GILLIAM, Primary Examiner